United States Patent
Kidamura et al.

(10) Patent No.: US 9,645,898 B2
(45) Date of Patent: May 9, 2017

(54) STORAGE CONTROL DEVICE AND CONTROL DEVICE FOR DETECTING ABNORMALITY OF SIGNAL LINE

(71) Applicant: FUJITSU LIMITED, Kawasaki-shi, Kanagawa (JP)

(72) Inventors: Takashi Kidamura, Kahoku (JP); Kuniaki Fujii, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 14/313,530

(22) Filed: Jun. 24, 2014

(65) Prior Publication Data
US 2015/0019919 A1 Jan. 15, 2015

(30) Foreign Application Priority Data
Jul. 9, 2013 (JP) ................................ 2013-143508

(51) Int. Cl.
G06F 11/00 (2006.01)
G06F 11/16 (2006.01)

(52) U.S. Cl.
CPC ...... *G06F 11/1604* (2013.01); *G06F 11/1612* (2013.01); *G06F 11/1679* (2013.01)

(58) Field of Classification Search
CPC . G06F 11/1604; G06F 11/1679; G06F 11/221
See application file for complete search history.

(56) References Cited

U.S. PATENT DOCUMENTS

| 4,782,300 | A  | * | 11/1988 | Bonaccio   | H04L 25/085  |
|           |    |   |         |            | 324/509      |
| 6,530,029 | B1 | * | 3/2003  | Metchev    | G06F 13/4291 |
|           |    |   |         |            | 713/400      |
| 7,069,476 | B1 | * | 6/2006  | Insley     | G06F 13/4291 |
|           |    |   |         |            | 710/110      |
| 7,424,383 | B2 | * | 9/2008  | Nakatsuhama| G06F 11/0757 |
|           |    |   |         |            | 702/120      |
| 7,526,589 | B2 | * | 4/2009  | Cagno      | G06F 13/4295 |
|           |    |   |         |            | 710/110      |
| 7,536,492 | B2 | * | 5/2009  | Cagno      | G06F 13/4291 |
|           |    |   |         |            | 710/100      |

(Continued)

FOREIGN PATENT DOCUMENTS

JP 11-502643 3/1999
JP 2002-063080 2/2002

(Continued)

OTHER PUBLICATIONS

Japanese Office Action mailed Mar. 7, 2017 for corresponding Japanese Patent Application No. 2013-143508, with English Translation, 6 pages.

*Primary Examiner* — Marc Duncan
(74) *Attorney, Agent, or Firm* — Fujitsu Patent Center

(57) ABSTRACT

A controller module (CM) includes buffers that feed back signals output using respective signal lines used for mutual communication with other CM, and a first detecting unit and a second detecting unit that detect abnormality such that the levels of the signals output using the signal lines do not change from respective specific levels when each level of the fed-back signals does not coincide with an expected level being a level previously determined according to a predetermined timing.

5 Claims, 7 Drawing Sheets

(56) References Cited

U.S. PATENT DOCUMENTS

| | | | | |
|---|---|---|---|---|
| 8,131,900 B2* | 3/2012 | Takehara | ............ | G06F 11/0745 710/110 |
| 2006/0242348 A1* | 10/2006 | Humphrey | .......... | G06F 13/4291 710/305 |
| 2007/0240019 A1* | 10/2007 | Brady | ................ | G06F 13/4291 714/43 |
| 2008/0046603 A1* | 2/2008 | Kobayashi | ............ | G06F 11/364 710/17 |
| 2011/0208885 A1* | 8/2011 | Kwek | ................ | G06F 13/4072 710/107 |
| 2011/0320895 A1* | 12/2011 | Zeidler | ................ | G06F 11/221 714/724 |
| 2012/0246510 A1 | 9/2012 | Kojina | | |

FOREIGN PATENT DOCUMENTS

| | | |
|---|---|---|
| JP | 2008-197752 | 8/2008 |
| JP | 2009-535677 | 10/2009 |
| JP | 2011-199743 A | 10/2011 |
| JP | 2012-68907 A | 4/2012 |
| JP | 2012-198822 A | 10/2012 |
| WO | 9622572 | 7/1996 |
| WO | 2007113766 | 10/2007 |

* cited by examiner

STORAGE CONTROL DEVICE AND CONTROL DEVICE FOR DETECTING ABNORMALITY OF SIGNAL LINE

CROSS-REFERENCE TO RELATED APPLICATION

This application is based upon and claims the benefit of priority of the prior Japanese Patent Application No. 2013-143508, filed on Jul. 9, 2013, the entire contents of which are incorporated herein by reference.

FIELD

The embodiments discussed herein are related to a storage control device and the like.

BACKGROUND

In a Redundant Arrays of Inexpensive Disks (RAID) system, a controller module (CM) as a control device and a redundant CM in other system notify each other of various states in each of the CMs using inter-CM communication. For example, Inter-Integrated Circuit (I2C) bus is used for the inter-CM communication.

FIG. 6 is a diagram of the inter-CM communication using the I2C bus. As illustrated in FIG. 6, the CM includes a Field Programmable Gate Array (FPGA). The FPGA includes a master port and a slave port. The CM is made redundant, and the inter-CM communication is performed using the I2C bus between the master port in one system and the slave port in the other system.

The I2C bus is used to transmit and receive data using a clock output from the master port in the one system. Therefore, if there occurs any device fault or stuck fault in which a signal level of the clock is stuck to a specific level due to abnormality in a signal line, subsequent communication including data transmission/reception becomes impossible. In this way, the impossibility of communication is called "deadlock".

FIG. 7 is a diagram of an example of how the deadlock occurs. As illustrated in FIG. 7, when a stuck fault occurs in a clock signal, the signal level of the clock signal does not change, and this causes subsequent data transmission/reception to become impossible.

When Serial Data Access (SDA) indicating a signal line for data is in an abnormal state in which the SDA is stuck to a fixed value of a low level, then the state in which input/output data is kept to the fixed value and does not change therefrom is detected. A technology is known in which, when the state where input/output data is kept to a fixed value and does not change therefrom continues for a given period of time, then it is determined that the I2C bus is in an abnormal state (see Patent Literature 2).

Patent Literature 1: Japanese Laid-open Patent Publication No. 2008-197752
Patent Literature 2: Japanese Laid-open Patent Publication No. 2002-063080
Patent Literature 3: Japanese National Publication of International Patent Application No. 2009-535677
Patent Literature 4: Japanese National Publication of International Patent Application No. 11-502643

However, the inter-CM communication using the I2C bus has a problem in which the abnormal state of the I2C bus is not detected. As an example, the abnormal state that the I2C bus is stuck to a specific level is not detected in the inter-CM communication.

The problem arises not only in the RAID system but also in components that communicate with each other using signals, such as Central Processing Unit (CPU) and a memory.

SUMMARY

According to an aspect of an embodiment, a storage control device includes a feedback unit and a detecting unit. The feedback unit feeds back a signal output using a signal line used for mutual communication with other storage control device. The detecting unit detects abnormality such that a level of the signal output using the signal line does not change from a specific level when a level of the signal fed back by the feedback unit does not coincide with an expected level being a level previously determined according to a predetermined timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. This invention is not limited by the embodiments. Cases in which the present invention is applied to the RAID system are explained below.

[a] First Embodiment

Figure 1:
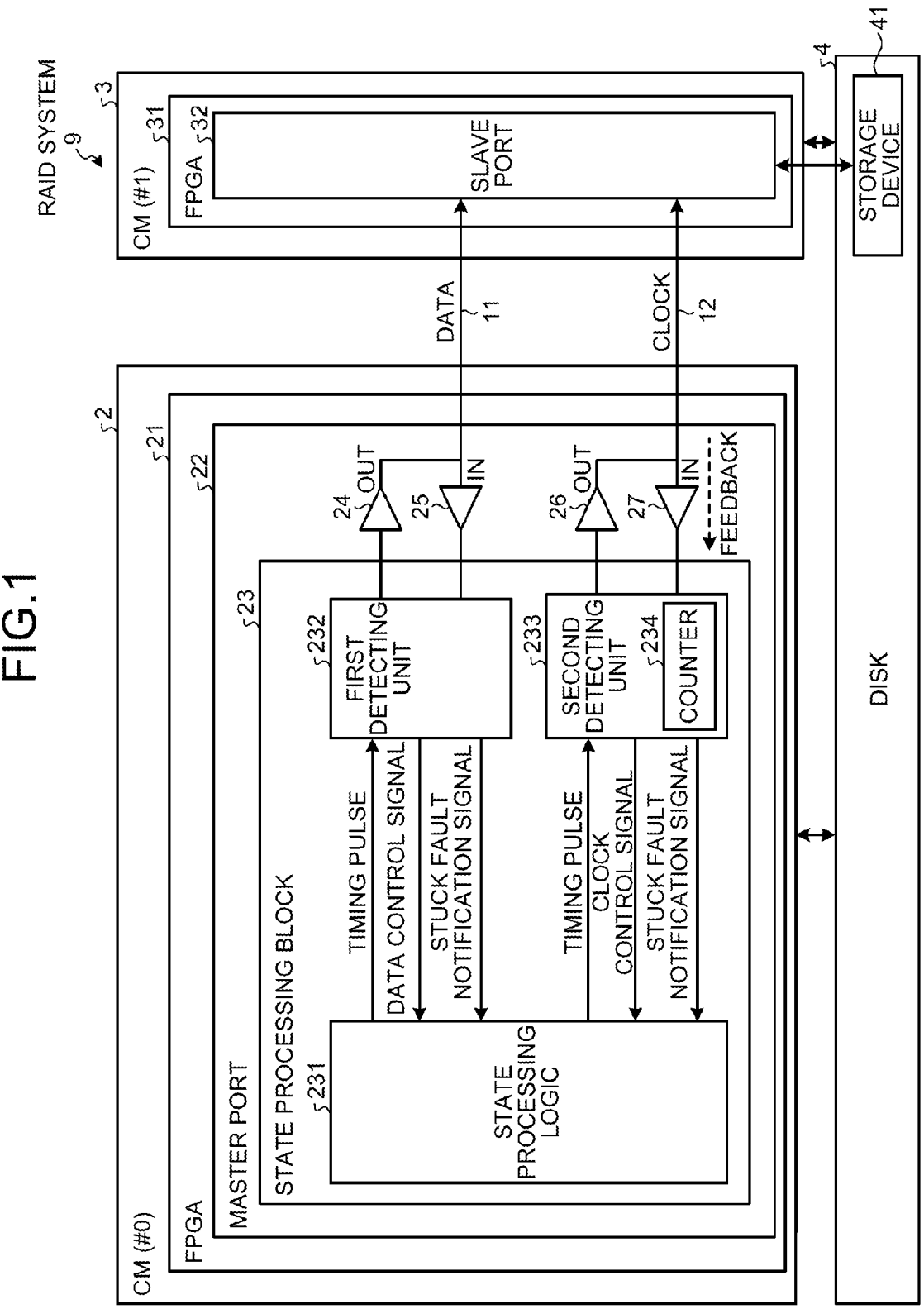
FIG. 1 is a diagram of a hardware configuration of a RAID system according to a first embodiment.

Configuration of RAID System
FIG. 1 is a diagram of a hardware configuration of a RAID system according to a first embodiment. As illustrated in FIG. 1, a RAID system 9 includes a data line 11 for transmitting a data signal, a clock line 12 for transmitting a clock signal, a plurality of controller modules (CMs) 2 and 3, and a disk 4. The CMs 2 and 3 are made redundant. In this case, the CM 2 of #0 system and the CM 3 of #1 system perform inter-CM communication via the data line 11 and the clock line 12. For example, the I2C bus is used for the data line 11 and the clock line 12.

The data line 11 and the clock line 12 are respectively connected between a master port 22 of the CM 2 and a slave port 32 of the CM 3, which are explained later. The master port 22 includes a buffer 25 for an input ("in") in addition to a buffer 24 for an output ("out") on the data line 11 in order to feed back a data signal output through the data line 11. Moreover, the master port 22 includes a buffer 27 for an input ("in") in addition to a buffer 26 for an output ("out") on the clock line 12 in order to feed back a clock signal output through the clock line 12. Thereby the data line 11 and the clock line 12 can be used to feed back the signal output from the master port 22 and again input the signal to the master port 22. The master port 22 receives the fed-back signal, and detects an abnormal state in which the level of the signal is stuck to a specific level when a level of the received signal does not coincide with an expected level set according to a timing of receiving or outputting the signal. The buffers 25 and 27 are examples of a "feedback unit".

The CMs 2 and 3 are connected to a storage such as the disk 4 to control the disk 4. The disk 4 includes a storage device 41 that stores therein data. The CM 2 is an example of "storage control device", and the CM 3 is an example of "other storage control device".

The CM 2 includes an FPGA 21. The FPGA 21 is an integrated circuit that assists in controlling the CM 2. The FPGA 21 includes the master port 22. Although the FPGA 21 has a slave port in addition to the master port 22, it is omitted in FIG. 1. The master port 22 has a state processing block 23. The state processing block 23 includes a state processing logic 231, a first detecting unit 232, and a second detecting unit 233.

The CM 3 includes an FPGA 31. The FPGA 31 is an integrated circuit that assists in controlling the CM 3. The FPGA 31 includes the slave port 32. Although the FPGA 31 has a master port in addition to the slave port 32, it is omitted in FIG. 1. The master port in the FPGA 31 has the same configuration as that of the master port 22 in the FPGA 21.

The state processing logic 231 executes an access process to I2C communication between the CMs. For example, the state processing logic 231 issues a timing pulse indicating start of access from a standby state to execute the access process to the I2C communication. The state processing logic 231 then starts an output of the clock signal and starts a data process. Thereafter, the state processing logic 231 issues a timing pulse indicating completion of access, and shifts to the standby state. The timing pulse indicating the start of access is called "Start Condition". The timing pulse indicating the completion of access is called "Stop Condition". The state processing logic 231 executes the processes according to an I2C communication protocol.

An example of the I2C communication protocol will be explained below. When the level of a signal is a high level before the issue of the Start Condition, the I2C communication is in a normal state. On the other hand, when the level of the signal is a low level, the I2C communication is in an abnormal state indicating that the level is stuck to the low level (called "low-stuck fault"). The I2C communication is in the normal state when the level of a data signal is the low level at a timing of starting the output of the clock signal after the issue of the Start Condition. On the other hand, when the level of the data signal is the high level, the I2C communication is in the abnormal state indicating that the level is stuck to the high level (called "high-stuck fault"). The I2C communication is in the normal state when the level of the data signal is the low level before the issue of the Stop Condition. On the other hand, when the level of the data signal is the high level, the I2C communication is in the abnormal state indicating that the level is stuck to the high level (called "high-stuck fault"). The I2C communication is in the normal state when the level of the signal is the high level after the issue of the Stop Condition. On the other hand, when the level of the signal is the low level, the I2C communication is in the abnormal state indicating that the level is stuck to the low level (called "low-stuck fault").

The first detecting unit 232 receives a fed-back data signal, and determines whether the level of the received data signal coincides with an expected level previously determined according to before or after the reception of a predetermined timing pulse. When the level of the fed-back data signal does not coincide with the expected level, the first detecting unit 232 detects abnormality such that the level is stuck to the specific level.

For example, before the reception of the Start Condition issued from the state processing logic 231, when the level of the fed-back data signal does not coincide with the high level being the expected level, the first detecting unit 232 detects the abnormality such that the level is stuck to the low level. That is, the first detecting unit 232 detects "low-stuck fault".

After the reception of the Start Condition issued from the state processing logic 231, when the level of the fed-back data signal does not coincide with the low level being the expected level at a timing of starting the output of the clock signal, the first detecting unit 232 detects the abnormality such that the level is stuck to the high level. That is, the first detecting unit 232 detects "high-stuck fault".

Before the reception of the Stop Condition issued from the state processing logic 231, when the level of the fed-back data signal does not coincide with the low level being the expected level, the first detecting unit 232 detects the abnormality such that the level is stuck to the high level. That is, the first detecting unit 232 detects "high-stuck fault".

After the reception of the Stop Condition issued from the state processing logic 231, when the level of the fed-back data signal does not coincide with the high level being the expected level, the first detecting unit 232 detects the abnormality such that the level is stuck to the low level. That is, the first detecting unit 232 detects "low-stuck fault".

The second detecting unit 233 includes a counter 234. The counter 234 counts each cycle of the clock.

The second detecting unit 233 receives a fed-back clock signal, and determines whether the level of the received clock signal coincides with a predetermined level being an expected level within a given period of time for ½ cycle of the clock after the detection of the predetermined level. The second detecting unit 233 also determines whether the level coincides with a level, being an expected level, different from the predetermined level within a given period of time for ½ cycle of the clock after the given period of time is elapsed since the detection of the predetermined level. When the level of the fed-back clock signal does not coincide with the expected level, the second detecting unit 233 detects the abnormality such that the level of the signal does not change from the specific level.

For example, when one clock cycle is set to N counts, the second detecting unit 233 sets the expected level as a low level within a given period of time being from 0 to N/2 counts, and sets the expected level as a high level within a given period of time being from N/2 to N counts after the elapse of N/2 counts. The second detecting unit 233 detects the low level and then causes the counter 234 to count from 0.

When the count value of the counter 234 is from 0 to N/2 and if the level of the fed-back clock signal does not coincide with the low level being the expected level, the second detecting unit 233 detects the abnormality such that the level is stuck to the high level. That is, the second detecting unit 233 detects "high-stuck fault".

When the count value of the counter 234 is from N/2 to N and if the level of the fed-back clock signal does not coincide with the high level being the expected level, the second detecting unit 233 detects the abnormality such that the level is stuck to the low level. That is, the second detecting unit 233 detects "low-stuck fault".

The second detecting unit 233 receives the fed-back clock signal, and determines whether the level of the received clock signal coincides with an expected level previously determined according to before or after the reception of a predetermined timing pulse. When the level of the fed-back clock signal does not coincide with the expected level, the second detecting unit 233 detects the abnormality such that the level is stuck to the specific level.

For example, before the reception of the Start Condition issued from the state processing logic 231, when the level of the fed-back clock signal does not coincide with the high level being the expected level, the second detecting unit 233 detects the abnormality such that the level is stuck to the low level. That is, the second detecting unit 233 detects "low-stuck fault".

After the reception of the Stop Condition issued from the state processing logic 231, when the level of the fed-back clock signal does not coincide with the high level being the expected level at a timing of returning to the standby state, the second detecting unit 233 detects the abnormality such that the level is stuck to the low level. That is, the second detecting unit 233 detects "low-stuck fault".

Flowchart of Fault Detection Process

Figure 2A:
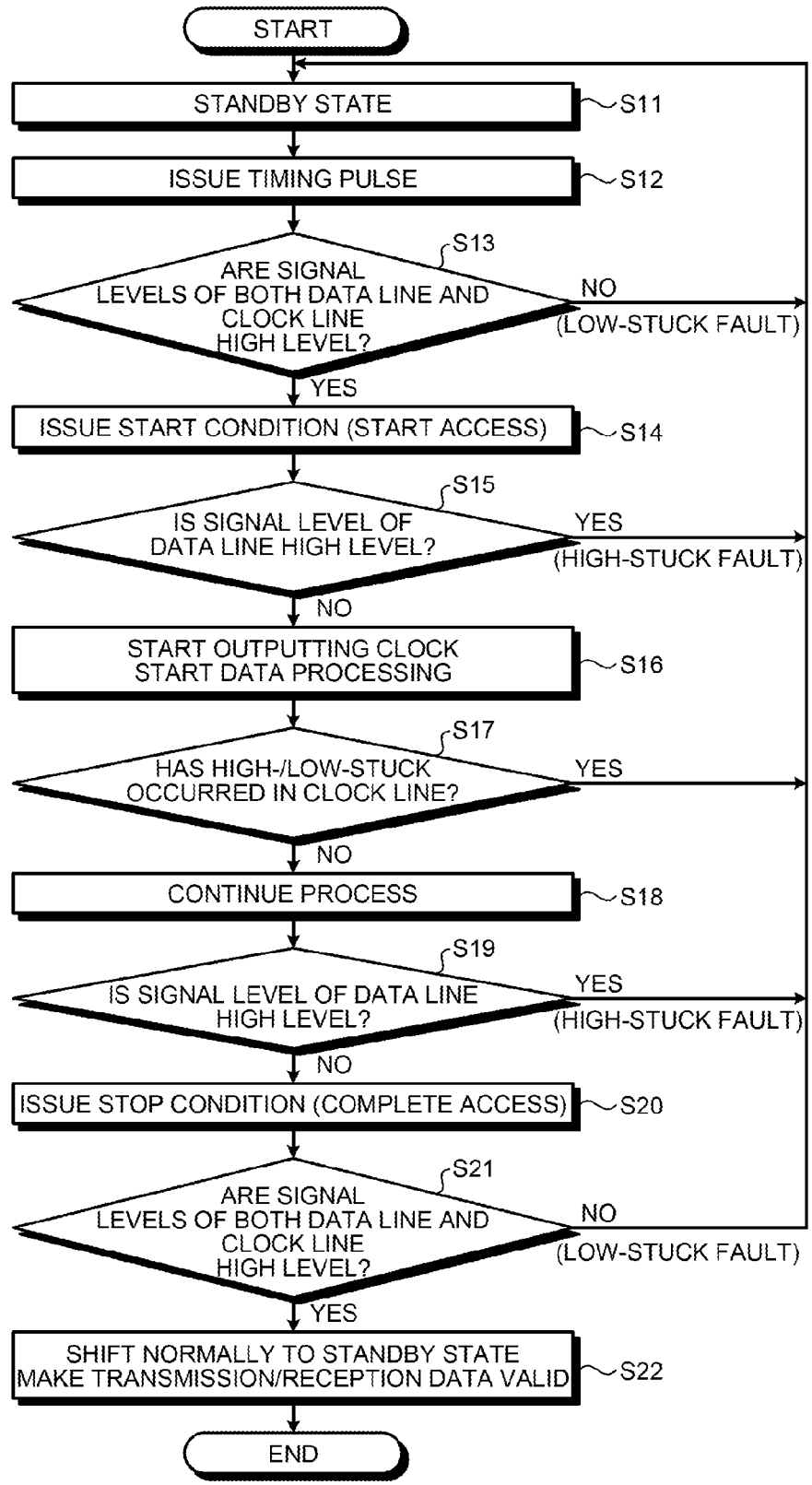
FIG. 2A is a flowchart of a fault detection process according to the first embodiment.

The fault detection process according to the first embodiment will be explained next with reference to FIG. 2A. FIG. 2A is a flowchart of the fault detection process according to the first embodiment. As illustrated in FIG. 2A, the state processing logic 231 of the master port 22 is assumed to be in the standby state.

As illustrated in FIG. 2A, the state processing logic 231 of the master port 22 is in the standby state (Step S11). The state processing logic 231 in the standby state then issues a timing pulse to the first detecting unit 232 and to the second detecting unit 233 (Step S12).

The first detecting unit 232 then determines whether the level of the fed-back signal on the data line 11 is the high level. The second detecting unit 233 determines whether the level of the fed-back signal on the clock line 12 is the high level (Step S13). When it is determined that the signal level of the data line 11 is not the high level (No at Step S13), the first detecting unit 232 notifies the state processing logic 231 that the data line 11 has "low-stuck fault". When it is determined that the signal level of the clock line 12 is not the high level (No at Step S13), the second detecting unit 233 notifies the state processing logic 231 that the clock line 12 has "low-stuck fault". The state processing logic 231 proceeds to Step S11 to return to the standby state.

Meanwhile, when it is determined that the signal levels of both the data line 11 and the clock line 12 are the high level (Yes at Step S13), then the state processing logic 231 determines that the signal level before the issue of the Start Condition coincides with the expected level (high level). The state processing logic 231 then issues Start Condition to the first detecting unit 232 and to the second detecting unit 233 (Step S14). Thereby the access process to the I2C communication is started.

Subsequently, the first detecting unit 232 determines whether the signal level of the fed-back signal on the data line 11 is the high level (Step S15). When it is determined that the signal level of the data line 11 is the high level (Yes at Step S15), then the first detecting unit 232 notifies the state processing logic 231 that the data line 11 has "high-stuck fault". The state processing logic 231 then proceeds to Step S11 to return to the standby state.

Meanwhile, when it is determined that the signal level of the data line 11 is not the high level (No at Step S15), then the state processing logic 231 determines that the signal level of the data line 11 after the issue of Start Condition coincides with the expected level (low level). The state processing logic 231 then starts outputting the clock signal and also starts a data process (Step S16).

Subsequently, the second detecting unit 233 determines whether "high-stuck" or "low-stuck" has occurred in the clock line 12 (Step S17). The high-stuck mentioned here means that the signal level is stuck to the high level. The low-stuck mentioned here means that the signal level is stuck to the low level. When it is determined that the high-stuck has occurred in the clock line 12 (Yes at Step S17), then the second detecting unit 233 notifies the state processing logic 231 that the clock line 12 has "high-stuck fault". When it is determined that the low-stuck has occurred in the clock line 12 (Yes at Step S17), then the second detecting unit 233 notifies the state processing logic 231 that the clock line 12 has "low-stuck fault". The state processing logic 231 then proceeds to Step S11 to return to the standby state.

Meanwhile, when it is determined that the high-stuck or the low-stuck has not occurred in the clock line 12 (No at Step S17), then the state processing logic 231 continues the process (Step S18).

Subsequently, the first detecting unit 232 determines whether the signal level of the fed-back signal on the data line 11 is the high level (Step S19). When it is determined that the signal level of the data line 11 is the high level (Yes at Step S19), then the first detecting unit 232 notifies the state processing logic 231 that the data line 11 has "high-stuck fault". The state processing logic 231 then proceeds to Step S11 to return to the standby state.

Meanwhile, when it is determined that the signal level of the data line 11 is not the high level (No at Step S19), then the state processing logic 231 determines that the signal level of the data line 11 before the issue of the Stop Condition coincides with the expected level (low level). The state processing logic 231 then issues Stop Condition to the first detecting unit 232 and to the second detecting unit 233 (Step S20). Thereby the access to the I2C communication is completed.

Subsequently, the first detecting unit 232 determines whether the signal level of the fed-back signal on the data line 11 is the high level. The second detecting unit 233 determines whether the level of the fed-back signal on the clock line 12 is the high level (Step S21). When it is determined that the signal level of the data line 11 is not the high level (No at Step S21), then the first detecting unit 232 notifies the state processing logic 231 that the data line 11 has "low-stuck fault". When it is determined that the signal level of the clock line 12 is not the high level (No at Step S21), the second detecting unit 233 notifies the state processing logic 231 that the clock line 12 has "low-stuck fault". The state processing logic 231 then proceeds to Step S11 to return to the standby state.

Meanwhile, when it is determined that the signal levels of both the data line 11 and the clock line 12 are the high level (Yes at Step S21), then the state processing logic 231 determines that the signal levels after the issue of the Stop Condition coincide with the expected level (high level). The state processing logic 231 then shifts normally to the standby state, and the transmission/reception data becomes valid (Step S22). Thereby, the fault detection process is ended.

Figure 2B:
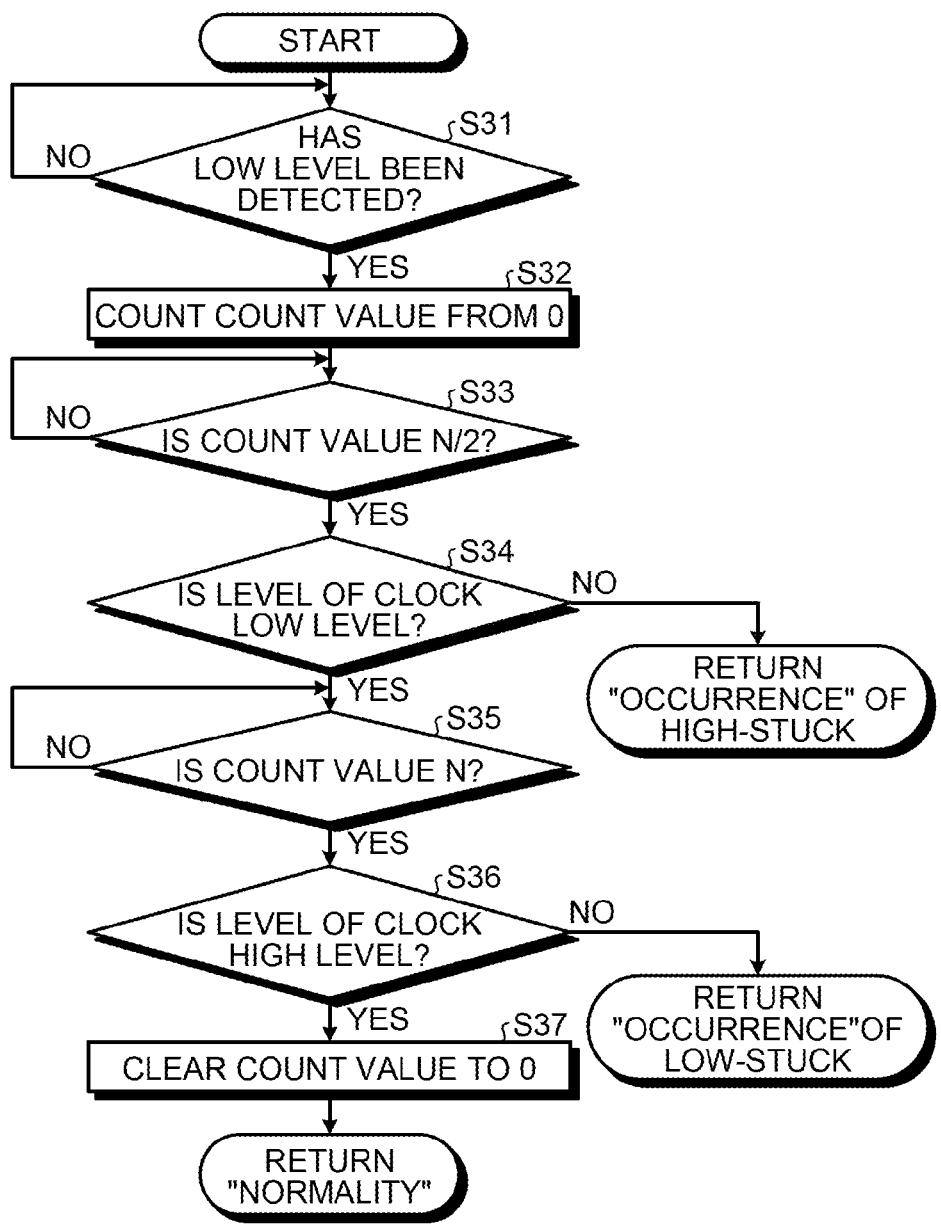
FIG. 2B is a flowchart of a high-/low-stuck occurrence determination process performed on a clock line.

Flowchart of High-/Low-Stuck Occurrence Determination Process Performed on Clock Line A high-/low-stuck occurrence determination process performed on the clock line according to the first embodiment will be explained below with reference to FIG. 2B. FIG. 2B is a flowchart of the high-/low-stuck occurrence determination process performed on the clock line according to the first embodiment.

As illustrated in FIG. 2B, the second detecting unit 233 determines whether the low level has been detected in the fed-back clock signal (Step S31). When it is determined that the low level has not been detected in the fed-back clock signal (No at Step S31), then the second detecting unit 233 repeats the determination process until the low level is detected.

Meanwhile, when it is determined that the low level has been detected in the fed-back clock signal (Yes at Step S31), then the second detecting unit 233 counts the count value of the counter 234 from 0 (Step S32).

The second detecting unit 233 determines whether the count value is N/2 (Step S33). When it is determined that the count value is not N/2 (No at Step S33), then the second detecting unit 233 repeats the determination process until the count value reaches N/2. Meanwhile, when it is determined that the count value is N/2 (Yes at Step S33), then the second detecting unit 233 determines whether the signal level of the fed-back clock signal is the low level (Step S34). When it is determined that the signal level of the fed-back clock signal is the low level (Yes at Step S34), then the second detecting unit 233 determines that the signal level coincides with the expected level (low level), and proceeds to Step S35.

Meanwhile, when it is determined that the signal level of the fed-back clock signal is not the low level (No at Step S34), then the second detecting unit 233 returns "occurrence" of the high-stuck in which the level is stuck to the high level.

At Step S35, the second detecting unit 233 determines whether the count value is N (Step S35). When it is determined that the count value is not N (No at Step S35), then the second detecting unit 233 repeats the determination process until the count value reaches N. Meanwhile, when it is determined that the count value is N (Yes at Step S35), then the second detecting unit 233 determines whether the signal level of the fed-back clock signal is the high level (Step S36).

When it is determined that the signal level of the fed-back clock signal is the high level (Yes at Step S36), then the second detecting unit 233 determines that the signal level coincides with the expected level (high level). The second detecting unit 233 then clears the count value of the counter 234 to 0 (Step S37). The second detecting unit 233 returns "normality" that the signal level of the clock signal is normal.

Meanwhile, when it is determined that the signal level of the fed-back clock signal is not the high level (No at Step S36), then the second detecting unit 233 returns "occurrence" of the low-stuck in which the level is stuck to the low level.

Effects of First Embodiment

According to the first embodiment, the buffers 25 and 27 feed back the signals output using the data line 11 and the clock line 12 respectively. The first detecting unit 232 and the second detecting unit 233 receive the fed-back signals. When each level of the received signals does not coincide with the expected level according to a timing of receiving or outputting the signal, the first detecting unit 232 and the second detecting unit 233 detect the abnormality such that the signal levels do not change from the respective specific levels. According to this configuration, the first detecting unit 232 and the second detecting unit 233 can detect a factor of transmission abnormality such that the signal level is stuck to the specific level by using an expected level according to the timing of receiving or outputting the signal for comparison with the signal level of the fed-back signal.

According to the first embodiment, the buffers 25 and 27 feed back signals output at a timing before or after reception of a timing signal indicating a predetermined timing. The first detecting unit 232 and the second detecting unit 233 receive the respective fed-back signals. When each level of the received signals does not coincide with the expected level previously determined according to before or after reception of the timing signal, the first detecting unit 232 and the second detecting unit 233 detect the abnormality such that each level of the signals does not change from the specific level. According to this configuration, the first detecting unit 232 and the second detecting unit 233 use the expected level previously determined according to before or after reception of the timing signal for comparison with the signal level of the fed-back signal. This enables detection of the factor of the transmission abnormality such that the signal level is stuck to the specific level.

According to the first embodiment, the buffers 25 and 27 feed back the clock signal output using the clock line 12. The second detecting unit 233 receives the fed-back clock signal. When the level of the received clock signal does not coincide with the low level being the expected level within a given period of time for ½ cycle of the clock after the detection of the low level, the second detecting unit 233 detects the abnormality such that the level of the clock signal does not change from the high level. When the level of the received clock signal does not coincide with a level, being the expected level, different from the high level within a given period of time after the given period of time is elapsed since the detection of the low level, the second detecting unit 233 detects the abnormality such that the level of the clock signal does not change from the low level. According to this configuration, the second detecting unit 233 uses an expected level, in which the ½ cycle before the clock is set as a low level and the ½ cycle after the clock is set as a high level, for comparison with the signal level of the fed-back signal. This enables detection of the factor of the transmission abnormality such that the signal level is stuck to the low level or to the high level.

Second Embodiment

It has been explained that the second detecting unit 233 according to the first embodiment detects the low-stuck fault in which the level is stuck to the low level when the count value is from N/2 to N and if the level of the fed-back clock signal does not coincide with the high level. However, the slave port 32 may forcibly pull the level of the clock signal to the low level. In this case, the second detecting unit 233 erroneously detects the low-stuck fault.

The erroneous detection of the low-stuck fault by the second detecting unit 233 is explained herein. A case in which the slave port 32 pulls the level of the clock signal to the low level is explained below. The slave port 32 sometimes reads information from the storage device 41 provided outside the FPGA 31 and transmits the read information to the master port 22. In this case, the slave port 32 pulls the clock to the low level during a preparation process of the read data and keeps the process of the master port 22 to wait for a given period of time. In this way, the pulling of the clock to the low level performed by the slave port 32 is called "clock stretch". The clock stretch is a function provided in the I2C bus.

In the clock stretch, the slave port 32 forcibly pulls the clock to the low level. Therefore, the low level of the clock signal continues, and the second detecting unit 233 thereby detects the low-stuck fault in the clock signal although the process is normally performed. The state processing logic 231 having received the notification of the low-stuck fault from the second detecting unit 233 forcibly terminates the process. In other words, in the case of the clock stretch, the second detecting unit 233 erroneously detects the low-stuck fault.

Figure 3:
FIG. 3 is a diagram of a read sequence.

A situation where the clock stretch occurs will be explained below with reference to FIG. 3. FIG. 3 is a diagram of a read sequence. As illustrated in FIG. 3, the master port 22 issues Start Condition indicating the start of access and transmits the data to the slave port 32. When the preparation process for the read data is started, the slave port 32 forcibly pulls the clock signal to the low level for a period of the preparation process. In other words, the clock stretch occurs. Thereafter, when the preparation process of the read data is finished, the slave port 32 transmits the read data to the master port 22. When the transmission of the read data is finished, the master port 22 issues Stop Condition to complete the access.

In the second embodiment, a case in which the master port 22 determines whether the clock is stretched and then detects the low-stuck fault is explained below.

Configuration of RAID System According to Second Embodiment

Figure 4:
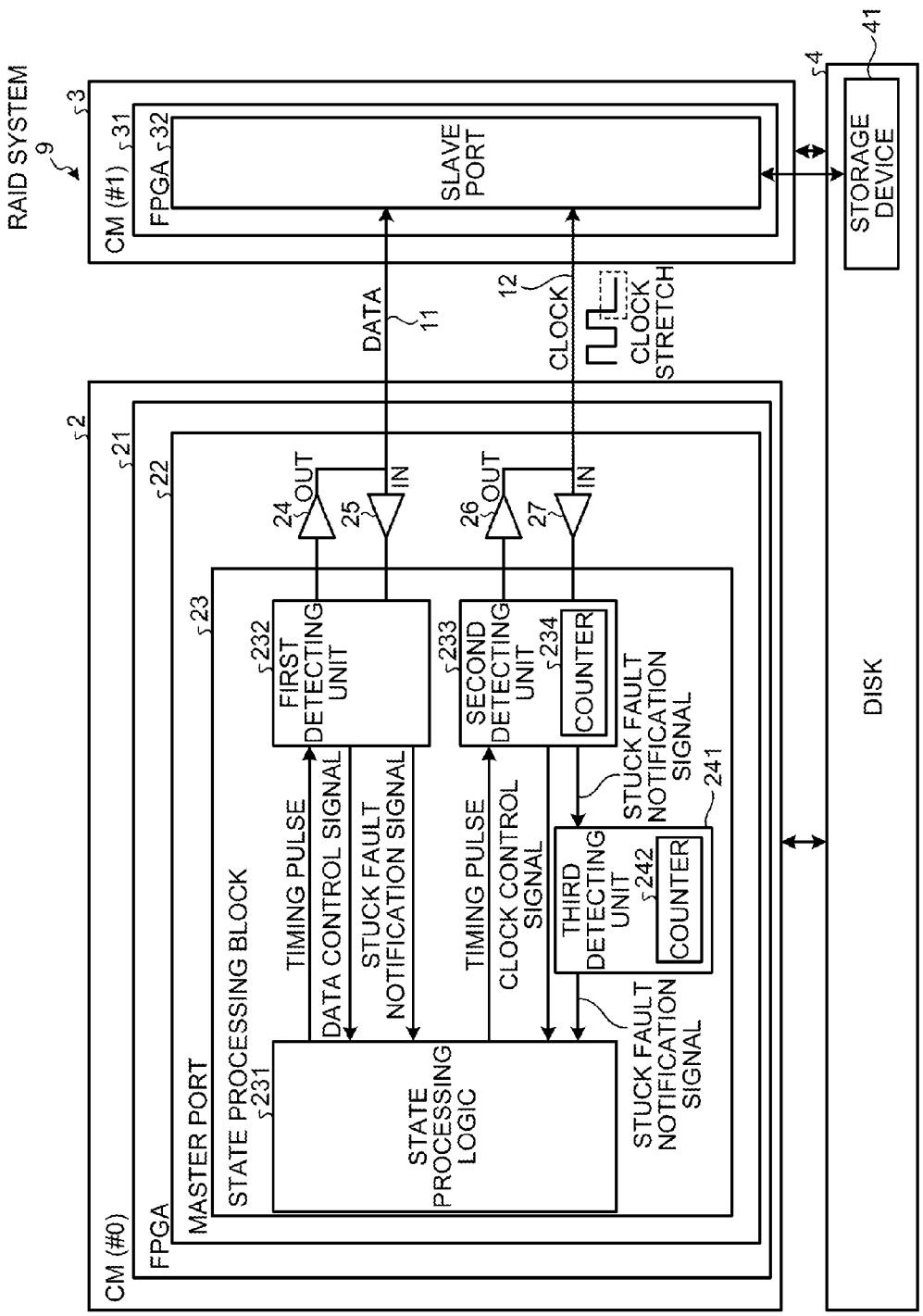
FIG. 4 is a diagram of a hardware configuration of a RAID system according to a second embodiment.

FIG. 4 is a diagram of a hardware configuration of a RAID system according to the second embodiment. The same reference sings are assigned to the same components as these of the RAID system illustrated in FIG. 1, and explanation of the overlapping components and operations is therefore omitted. A difference of the second embodiment from the first embodiment is a point in which a third detecting unit 241 is added to the master port 22.

When one clock cycle is set to N counts, the second detecting unit 233 sets an expected level to the low level within the given period of time being from 0 to N/2 counts, and sets an expected level to the high level within the given period of time being from N/2 to N counts after the elapse of N/2 counts. When the count value of the counter 234 is, for example, from N/2 to N and if the level of the fed-back clock signal does not coincide with the high level being the expected level, the second detecting unit 233 detects the occurrence of the low-stuck in which the level is stuck to the low level. In this case, the second detecting unit 233 notifies the third detecting unit 241 of the occurrence of the low-stuck.

The third detecting unit 241 includes a counter 242. The counter 242 counts each cycle of the clock.

When the occurrence of the low-stuck is notified from the second detecting unit 233, the third detecting unit 241 determines whether there is clock stretch or low-stuck fault in the clock signal. For example, the third detecting unit 241 causes the counter 242 to count a period of time in which the low level continues from 0. The third detecting unit 241 then determines whether the count value of the counter 242 exceeds a maximum clock stretch time. The maximum clock stretch time is a maximum time in which the clock stretch can be determined. When the count value of the counter 242 exceeds the maximum clock stretch time, then the third detecting unit 241 detects the abnormality such that the level is stuck to the low level. In other words, the second detecting unit 233 detects "low-stuck fault", while the third detecting unit 241 detects the clock stretch in the slave port 32 when the count value of the counter 242 does not exceed the maximum clock stretch time.

Flowchart of Fault Detection Process

Figure 5:
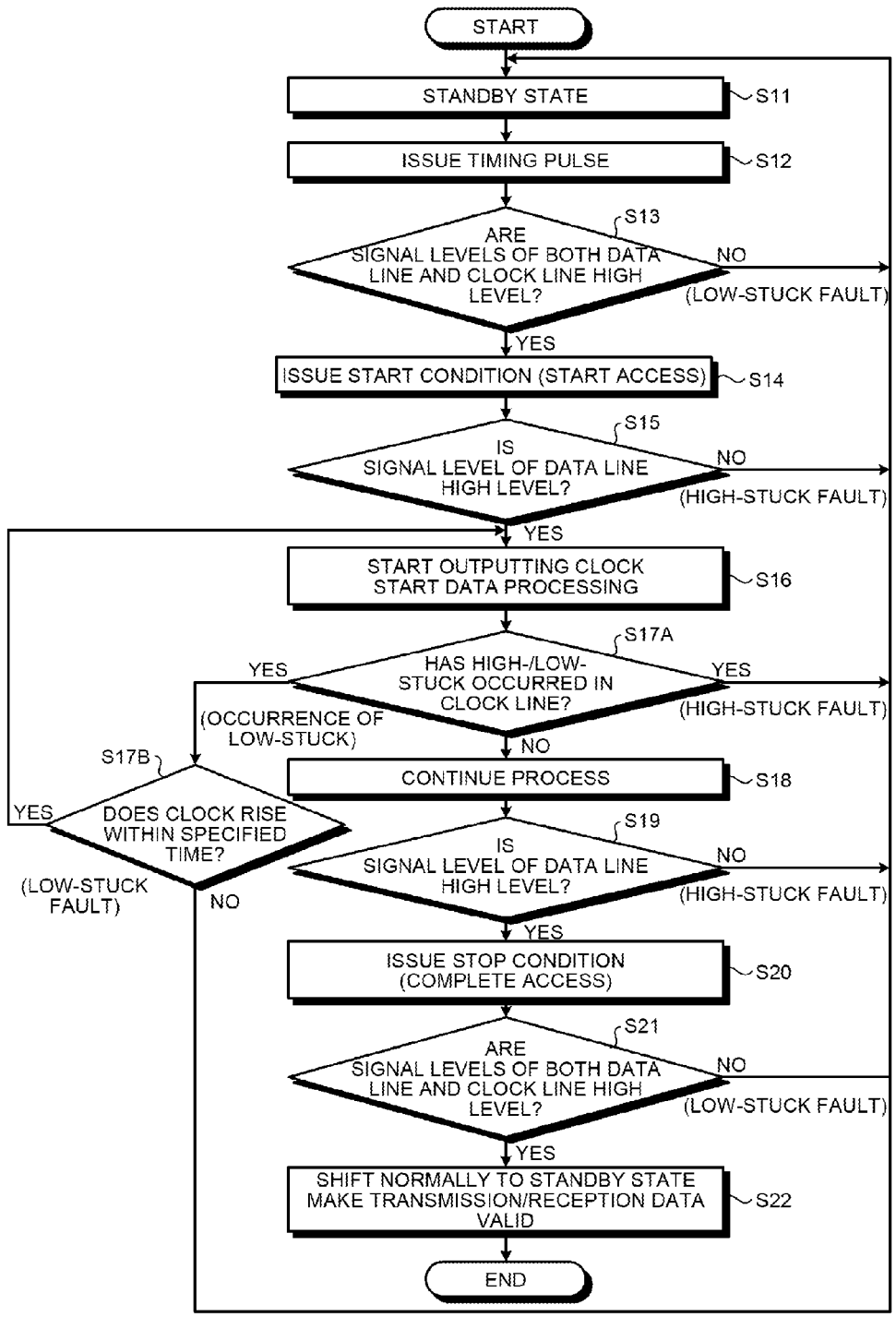
FIG. 5 is a flowchart of a fault detection process according to the second embodiment.
Figure 6:
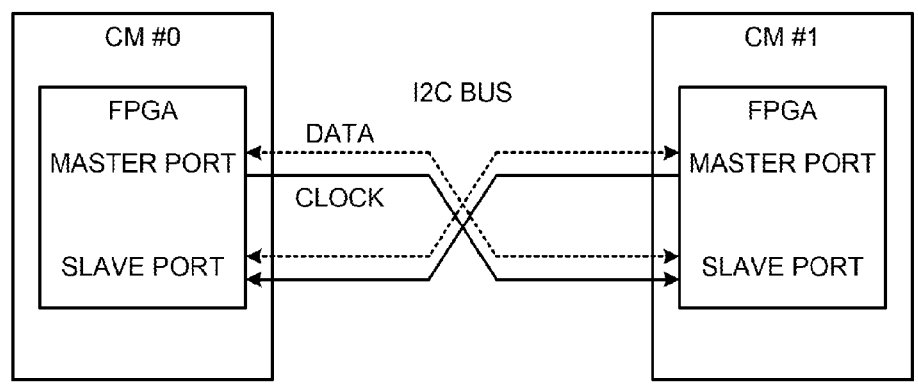
FIG. 6 is a diagram of inter-CM communication using I2C bus.
Figure 7:
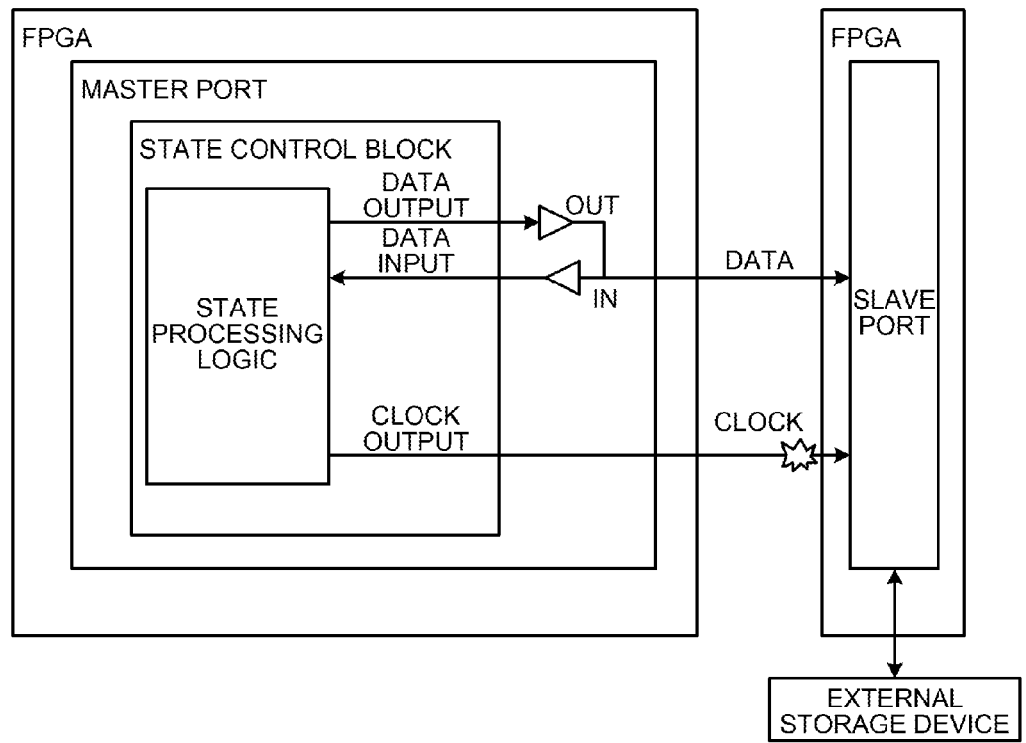
FIG. 7 is a diagram of an example of how deadlock occurs.

A fault detection process according to the second embodiment will be explained next with reference to FIG. 5. FIG. 5 is a flowchart of the fault detection process according to the second embodiment. The same reference signs are assigned to the same process as the fault detection process illustrated in FIG. 2A, and explanation of the overlapping process is therefore omitted.

As illustrated in FIG. 5, the state processing logic 231 of the master port 22 is in the standby state (Step S11). The state processing logic 231 issues a timing pulse to the first detecting unit 232 and to the second detecting unit 233, issues Start Condition thereto, starts an output of the clock signal, and starts the data process (Step S12 to Step S16).

Subsequently, the second detecting unit 233 determines whether high-stuck or low-stuck has occurred in the clock line 12 (Step S17A). The high-stuck mentioned here means that the signal level is stuck to the high level. The low-stuck mentioned here means that the signal level is stuck to the low level. When it is determined that the high-stuck has occurred in the clock line 12 (Yes at Step S17A), then the second detecting unit 233 notifies the state processing logic 231 that the clock line 12 has "high-stuck fault".

When it is determined that the low-stuck has occurred in the clock line 12 (Yes at Step S17A), then the second detecting unit 233 notifies the third detecting unit 241 that the clock line 12 has "low-stuck fault". The third detecting unit 241 then determines whether the clock rises within a specified time (Step S17B). The specified time mentioned here means the maximum clock stretch time. When it is determined that the clock rises within the specified time (Yes at Step S17B), then the third detecting unit 241 determines that the clock is stretched, and proceeds to Step S16 to shift to the data process.

Meanwhile, when it is determined that the clock does not rise within the specified time (No at Step S17B), then the third detecting unit 241 determines that the clock is not stretched, and notifies the state processing logic 231 that the clock line 12 has "low-stuck fault". Then, the state processing logic 231 proceeds to Step S11 to return to the standby state.

Meanwhile, when it is determined that the high-stuck or the low-stuck has not occurred in the clock line 12 (No at Step S17A), the state processing logic 231 continues the process (Step S18). Then, the state processing logic 231 issues Stop Condition to the first detecting unit 232 and to the second detecting unit 233, and shifts to the standby state if the clock line 12 is normal (Steps S19 to S22).

Effects of Second Embodiment

According to the second embodiment, when the level of the clock signal does not coincide with the high level being the expected level after the elapse of the given period of time since the detection of the low level, the second detecting unit 233 notifies the third detecting unit 241 of occurrence of the low-stuck. The third detecting unit 241 then counts a period of time in which the low level continues. When the counted period of time exceeds the specified time, then the third detecting unit 241 detects the abnormality such that the level of the signal does not change from the low level. When the counted period of time does not exceed the specified time, then the third detecting unit 241 detects the clock stretch in the slave port 32. According to this configuration, when the low-stuck occurs, the third detecting unit 241 can detect whether the low-stuck is the clock stretch, thus accurately detecting the low-stuck fault.

Others

In the first and the second embodiments, the RAID system 9 detects any stuck fault, targeted for the data line 11 and the clock line 12, in which the level is stuck to a specific signal level. However, the system is not limited to the RAID system, and therefore any system may be used if components that communicate with each other using signals are mounted thereon. The components that communicate with each other using signals are, for example, a CPU and a memory. The CPU and the memory are examples of "control device".

In the first and the second embodiments, when one clock cycle is set to N counts, the second detecting unit 233 sets the expected level to the low level within the given period of time being from 0 to N/2 counts, and sets the expected level to the high level within the given period of time being from N/2 to N counts after the elapse of N/2 counts. It has been explained that the second detecting unit 233 causes the counter 234 to count from 0 after the detection of the low level. However, the second detecting unit 233 may set the expected level to the high level within the given period of time being from 0 to N/2 counts, and set the expected level to the low level within the given period of time being from N/2 to N counts after the elapse of N/2 counts. In this case, the second detecting unit 233 has only to cause the counter 234 to count from 0 after the detection of the high level. When the count value of the counter 234 is from 0 to N/2 and if the level of the fed-back clock signal does not coincide with the high level being the expected level, then the second detecting unit 233 detects "low-stuck fault" in which the level is stuck to the low level. When the count value of the counter 234 is from N/2 to N and if the level of the fed-back clock signal does not coincide with the low level being the expected level, the second detecting unit 233 detects "high-stuck fault" in which the level is stuck to the high level. This enables the second detecting unit 233 to detect an abnormal state as a fault in which the level is stuck to the specific signal level.

According to one aspect of the system disclosed in the present disclosure, an abnormal state of the signal line can be detected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a control program that causes a computer to execute a process comprising:
   outputting a signal at a timing before or after reception of a timing signal indicating a predetermined timing, the signal being used for mutual communication with other storage control device; and
   detecting abnormality of the signal output being unchanged, the abnormality being detected when a level of a signal fed back through a signal line does not coincide with an expected level, the expected level being determined according to the predetermined timing and whether the signal fed back is output before or after the issue of the timing signal.

2. A control device comprising:
   a feedback unit that feeds back a signal output at a timing before or after reception of a timing signal indicating a predetermined timing, the signal being used for mutual communication with other control device; and
   a detecting unit that detects abnormality of the signal output being unchanged, the abnormality being detected when a level of the signal fed back by the feedback unit does not coincide with an expected level, the expected level being determined according to the predetermined timing and whether the signal fed back is output before or after the issue of the timing signal.

3. The control device according to claim 2, wherein
   the feedback unit feeds back a clock signal output using a signal line, and
   the detecting unit includes a second detecting unit that detects the abnormality of the signal output being unchanged and kept a specific level, when a level of the clock signal fed back by the feedback unit does not coincide with a first level or a second level within a given period of time for ½ cycle of the clock after detection of the first level or the second level, the first level and the second level being the expected levels and different from one another.

4. The control device according to claim 3, wherein
   the second detecting unit includes a third detecting unit that detects abnormality of the signal output when the counted period of time exceeds a specified time, the third detecting unit counting a period of time in which the first level continues when the level of the clock signal does not coincide with the second level after the elapse of the given period of time since the detection of the first level, the third detecting unit detecting clock stretch in the other control device when the counted period of time does not exceed the specified time.

5. The control device according to claim 2, wherein
   the predetermined timing includes a timing indicating start of access for the mutual communication and a timing indicating completion of access for the mutual communication.

* * * * *